Aug. 26, 1930.      D. S. BARROWS      1,774,164
BACK GEARED GENERATOR DRIVE
Filed Aug. 18, 1927
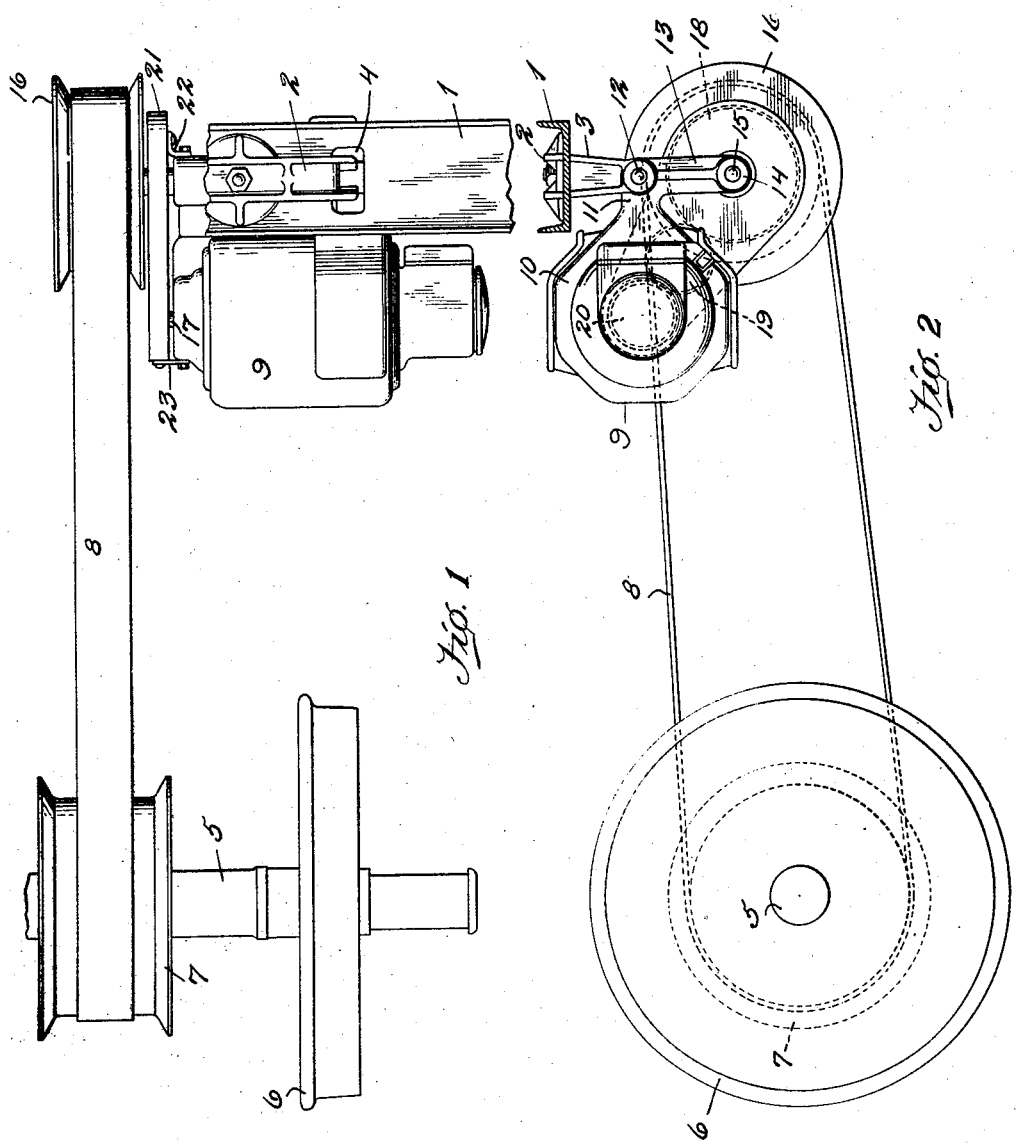
Inventor
Donald S. Barrows
By
Attorney Patented Aug. 26, 1930

1,774,164

UNITED STATES PATENT OFFICE

DONALD S. BARROWS, OF ROCHESTER, NEW YORK, ASSIGNOR, BY MESNE ASSIGNMENTS, TO SIMPLEX EQUIPMENT COMPANY, INC., OF NEW YORK, N. Y., A CORPORATION OF DELAWARE

BACK-GEARED GENERATOR DRIVE

Application filed August 18, 1927. Serial No. 213,861.

The invention relates to car lighting apparatus and has particular reference to the mounting and drive mechanism for the generator which supplies the electric power for the lighting system.

Ordinarily a generator is suspended in some suitable manner beneath a car and is driven from the axle by means of a pulley thereon and another pulley carried by the generator shaft, spring tension devices being commonly provided tending to swing the generator and thereby maintain the belt under proper tension to insure an adequate drive.

The principal object of the present invention is to provide a generator drive in which the driven pulley is not mounted directly upon the generator shaft but is geared thereto whereby practically any desired speed ratio between the car axle, or pulley thereon and the generator shaft may be had.

An important object of the invention is to provide a generator mounting of such character that gravity alone will be sufficient to maintain the belt under proper tension, thus obviating the employment of the usual and well known spring tension devices.

Another object of the invention is to provide a gear drive mechanism which will permit the employment of a larger driven pulley, thereby materially increasing the angle embraced by the belt without decreasing the generator speed, any decrease which would ordinarily result from the use of a larger pulley being compensated for, or more than compensated for, by the utilization of a desired ratio of the intermeshing gears which constitute the ultimate transmission.

A further object is to provide a transmission mechanism of this character in which the gears are enclosed by suitable means and consequently protected against the injurious effects which would result from the ingress of water, dirt or other foreign matter, the enclosing of such gears making it possible to have them run in a constant supply of lubricant so that undue wear will be entirely avoided.

Another object is to provide a mounting and drive of this character which may be constructed and installed at substantially the same, or little more, cost than is usually the case, the general suspension involving the use of well known stock parts to which are necessarily added certain detailed structural elements which may, however, be readily produced.

An additional object of the invention is to provide an arrangement of this character which will be not only simple and inexpensive but also highly efficient in operation, durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a plan view of a fragment of a car axle with drive pulley thereon, and a portion of the necessary support upon which the generator is mounted, and Figure 2 is a view in vertical longitudinal section with respect to the car, not shown, showing a side elevation of the generator mounted in accordance with the invention.

Referring more particularly to the drawing, it will be observed that I have omitted illustrating most of the usual and well known structural elements found beneath a car and which constitute the basic structure from which the generator is supported. However, I have shown the usual transverse channel bar 1 upon which is engaged and mounted the usual yoke casting 2 which has spaced depending arms 3 extending through openings 4 in the channel bar. The numeral 5 designates the car axle carrying the usual wheels 6, only one of which is shown, and also carrying the usual or any preferred drive pulley 7 peripherally engaged by the belt 8 which is employed for driving the generator 9.

In accordance with the present invention the generator casing is formed with, mounted in or otherwise carried by an adapter casting 10 comprising a bell-crank lever which has one or more substantially horizontally extending portions 11 pivoted, by one or more hinge pins 12, between the depending arms 3 of the yoke casting. This adapter casting 10 is formed or otherwise provided with a substantially vertically depending arm 13 having a suitable bearing 14 for a shaft 15 on which is secured the driven pulley 16 peripherally engaged by the belt 8.

Ordinarily, this pulley 16 is mounted upon the generator shaft 17 but, as stated above, in the present instance it is carried by the shaft 15, this shaft also carrying a gear 18 meshing with a suitably journaled idler gear 19 which, in turn, meshes with a gear 20 secured on the generator shaft 17, the various gears being preferably enclosed within a suitable gear box or housing 21 formed of any desired number of parts connected in any preferred manner and suitably mounted with respect to the generator and adapter casting. In the present instance I have illustrated brackets 22 and 23 of convenient pattern secured to the gear housing and to the adapter casting and generator, respectively.

It is to be noted that the generator is preferably arranged with it axis, that is to say its shaft, substantially in horizontal alinement with and parallel to the axis about which the generator and adapter casting may rotate, in other words the hinge pins 12; and it is to be further noted that the pulley shaft 15 is supported in parallel alignment in a substantially vertical position beneath the hinge pins 12. The purpose of this is to utilize the weight of the generator and associated parts for producing the proper tension upon the belt to insure an adequate driving engagement thereof with the pulleys 7 and 16 and this will of course occur as it is quite obvious that the weight of the generator tends to swing it downwardly and increase the distance between the pulley 16 and the pulley 7. In actual practice I have discovered that this downward swinging tendency of the generator will hold the belt taut, or sufficiently so, for all purposes without it being necessary to employ any tension device though, if found advisable for any reason, it is apparent that such might be provided within the scope of the invention.

In the operation it will be seen that when the pulley 7 is rotated the belt 8 engaging the pulley 16 will cause rotation of the shaft 15 and this will, in turn, be communicated through the gears 18, 19 and 20 to the shaft of the generator. By providing gears of proper ratio it is evident that the generator may be driven at the correct speed while, at the same time, there will be the great advantage of using a driven pulley 16 of much greater diameter than would be possible if it were mounted directly upon the generator shaft. It will be understood that by using a larger driven pulley the area or so called angle thereof engaged by the belt will be increased so that there will be less likelihood of slippage of the belt even under the most adverse conditions such as are bound to exist under certain circumstances.

Since the center of gravity of the generator is in a substantially horizontal plane passing through the hinge pin 12, it will be noted that the gravity moment of the generator about the hinge pin will be substantially constant throughout a considerable angular swing of the generator. Also, as the shaft 15, in swinging about the hinge pin, travels nearly horizontally toward or away from the car axle, the effective radius of pull against the belt is also substantially constant so that the belt tension maintained by gravity alone throughout the normal range of positions is practically constant. Hence, by proper designing and proportioning of parts, practically constant tension of just the right value may be had without the use of any spring tension device.

From the foregoing description and a study of the drawing it will be apparent that I have thus provided a simply constructed and easily installed mounting and drive means which will possess all the advantages sought for and which will be capable of readily performing the desired functions in a highy satisfactory manner. It is believed that the construction, operation and also the advantages will be readily apparent from the foregoing without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In car lighting equipment, in combination, a pulley mounted to rotate with a car axle, a fixed generator support, means hinged to said support having a substantially horizontal arm for supporting a generator and a substantially vertical arm for supporting a pulley shaft, a generator carried by said first arm, means for driving said pulley shaft from said axle pulley, and means for driving said generator from said pulley shaft.

2. In car lighting equipment, in combination, an axle carried pulley, a generator having a shaft, a gear on the generator shaft, a support for said generator, means pivotally mounting said support upon a portion of the car, a shaft rotatably mounted in said support and having a gear, an idler gear interposed between said gears, said support mounting means being disposed in offset relation to a plane passing through the axes of said generator shaft and the second named shaft, and a pulley on said second named shaft having a belt connection with the axle carried pulley.

3. In car lighting equipment, in combination, an axle carried pulley, a generator having a shaft, a gear on the generator shaft, a support for said generator, means pivotally mounting said support upon a portion of the car, a shaft rotatably mounted in said support and having a gear, an idler gear interposed between said gears, said support mounting means being disposed in offset relation to a plane passing through the axes of said generator shaft and the second named shaft, and upon the side of such plane most remote from said axle carried pulley.

4. In car lighting equipment, an axle carried pulley, a generator having a shaft, a gear on the generator shaft, a support for the generator, a shaft journally carried by the support and carrying a gear, an idler gear interposed between said gears, and a pulley on the second named shaft having a belt connection with the axle carried pulley, a housing for said gears and bracket members mounted respectively on the generator and the support for mounting the housing.

5. In car lighting equipment, in combination, an axle-carried pulley, a bell-crank lever pivotally mounted at its angle beneath the car, a generator carried by a laterally extending arm of said lever, a shaft rotatably mounted upon a downwardly extending arm of said lever, a pulley on said shaft having belt connection with said first pulley, and a mechanism driven by said shaft for driving the generator.

6. In car lighting equipment, in combination, an axle-carried pulley, a generator, a support for the generator comprising a lever whose two arms form substantially a right angle, pivotally mounted at said angle to permit downward swinging movement of the generator, the generator-supporting arm of said lever being normally substantially horizontal, a rotative shaft mounted upon the other arm of said lever in a plane below said generator shaft, a pulley upon said shaft belt-driven from said axle-driven pulley, and a transmission mechanism operated by said shaft for driving the generator.

7. In car lighting equipment, in combination, a pulley mounted to rotate with a car axle, a fixed generator support, a bell-crank lever hinged upon said support with one of its arms extending toward said axle in a substantially horizontal direction, a generator supported by said arm, a pulley shaft journaled in the other arm of said lever, a belt connecting said pulley shaft and said axle, and gear mechanism driven by said shaft for driving the generator.

8. In car lighting equipment, in combination, a pulley mounted to rotate with a car axle, a fixed generator support, a bell-crank lever hinged upon said support with one of its arms extending toward said axle in a substantially horizontal direction, a generator having a shaft supported by said arm, a gear on the generator shaft, a pulley shaft journaled in the other arm of said lever and carrying a gear, an idler gear interposed between said gears, and a belt adapted to drive said pulley shaft from said axle.

9. In car lighting equipment, in combination, a pulley mounted to rotate with a car axle, a fixed generator support, a bell-crank lever hinged upon said support with one of its arms extending toward said axle in a substantially horizontal direction, a generator having a shaft supported by said arm, a gear on the generator shaft, a pulley shaft journaled in the other arm of said lever and carrying a gear, an idler gear interposed between said gears, a housing for said gears, and a belt adapted to drive said pulley shaft from said axle.

10. In car lighting equipment, in combination, an axle carried pulley, a generator having a shaft, a support for said generator pivotally mounted upon said frame, a shaft rotatably mounted in said support, gearing adapted to transmit power from said second shaft to said generator shaft, a pulley on said second shaft having a belt connection with said axle carried pulley, the pivotal axis of said generator support being disposed in substantially the same horizontal plane as the axis of the generator shaft.

In testimony whereof I affix my signature.

DONALD S. BARROWS.